United States Patent
Lee

(10) Patent No.: US 9,521,472 B2
(45) Date of Patent: Dec. 13, 2016

(54) CONTROLLING METHOD FOR COEXISTENCE OF RADIO FREQUENCY IDENTIFICATION AND DISPLAY

(71) Applicant: E Ink Holdings Inc., Hsinchu (TW)

(72) Inventor: Cheng-Hao Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 287 days.

(21) Appl. No.: 13/925,853

(22) Filed: Jun. 25, 2013

(65) Prior Publication Data

US 2014/0062649 A1  Mar. 6, 2014

(30) Foreign Application Priority Data

Aug. 29, 2012 (TW) .............................. 101131376 A

(51) Int. Cl.
| | | |
|---|---|---|
| H04Q 9/02 | (2006.01) | |
| G06K 19/07 | (2006.01) | |
| G06F 3/147 | (2006.01) | |

(52) U.S. Cl.
CPC ............... *H04Q 9/02* (2013.01); *G06F 3/147* (2013.01); *G06K 19/0727* (2013.01); *G09G 2330/02* (2013.01); *G09G 2330/021* (2013.01); *G09G 2370/16* (2013.01); *G09G 2380/04* (2013.01)

(58) Field of Classification Search
CPC .... G06K 21/06; G06K 19/0727; G06Q 20/00; H01L 29/08; G06F 12/14; G06F 3/147; H04Q 9/02
USPC ........ 235/492, 462.01, 383; 705/16; 257/40; 726/22
See application file for complete search history.

(56) References Cited

U.S. PATENT DOCUMENTS

| | | | |
|---|---|---|---|
| 6,924,777 B2 | 8/2005 | Reasoner et al. | |
| 7,126,482 B2 | 10/2006 | Shoji et al. | |
| 7,152,040 B1* | 12/2006 | Hawthorne et al. ............ | 705/16 |
| 7,299,990 B2* | 11/2007 | Hoshina ........................ | 235/492 |
| 7,421,775 B2 | 9/2008 | Kwak et al. | |
| 7,679,081 B2* | 3/2010 | Chan et al. ..................... | 257/40 |
| 7,784,693 B2 | 8/2010 | Liao et al. | |
| 7,960,215 B2 | 6/2011 | Kobayashi et al. | |
| 2006/0184619 A1* | 8/2006 | Tano et al. .................... | 709/203 |

(Continued)

FOREIGN PATENT DOCUMENTS

| | | |
|---|---|---|
| CN | 101430773 | 5/2009 |
| TW | 201030691 | 8/2010 |
| TW | M436196 | 8/2012 |

OTHER PUBLICATIONS

"Office Action of Taiwan Counterpart Application", issued on Aug. 28, 2014, p. 1-p. 7, in which the listed references were cited.

(Continued)

*Primary Examiner* — Jennifer Mehmood
*Assistant Examiner* — Yong Hang Jiang
(74) *Attorney, Agent, or Firm* — Jianq Chyun IP Office

(57) ABSTRACT

A controlling method, adapted for an electronic device for coexistence of radio frequency identification (RFID) and display functions, is provided. The controlling method includes powering on a display of the electronic device and controlling the display to show a frame. Next, a RFID module of the electronic device is powered on to perform a wireless communication function of the RFID module. The controlling method of the invention efficiently controls the execution of the display and wireless communication functions, so as to prevent mutual interference.

9 Claims, 6 Drawing Sheets

(56) References Cited

U.S. PATENT DOCUMENTS

| | | | |
|---|---|---|---|
| 2006/0202042 A1* | 9/2006 | Chu | 235/492 |
| 2007/0057050 A1* | 3/2007 | Kuhno et al. | 235/383 |
| 2007/0102103 A1 | 5/2007 | Ku | |
| 2007/0108287 A1* | 5/2007 | Davis et al. | 235/462.01 |
| 2008/0142965 A1 | 6/2008 | Wang et al. | |
| 2008/0149731 A1* | 6/2008 | Arai et al. | 235/492 |
| 2009/0133921 A1 | 5/2009 | Sheu | |
| 2009/0313696 A1* | 12/2009 | Himberger et al. | 726/22 |
| 2010/0090914 A1 | 4/2010 | Watanabe | |
| 2010/0177018 A1 | 7/2010 | Wang et al. | |
| 2011/0079344 A1 | 4/2011 | Sheu | |
| 2011/0231206 A1* | 9/2011 | Claud | 705/3 |
| 2011/0287780 A1 | 11/2011 | Spire | |
| 2013/0151359 A1* | 6/2013 | Fujisawa | 705/17 |

OTHER PUBLICATIONS

"Office Action of China Counterpart Application," issued on Dec. 30, 2015, p. 1-p. 7, in which the listed references were cited.

* cited by examiner

CONTROLLING METHOD FOR COEXISTENCE OF RADIO FREQUENCY IDENTIFICATION AND DISPLAY

CROSS-REFERENCE TO RELATED APPLICATION

This application claims the priority benefit of Taiwan application serial no. 101131376, filed on Aug. 29, 2012. The entirety of the above-mentioned patent application is hereby incorporated by reference herein and made a part of this specification.

BACKGROUND OF THE INVENTION

Field of the Invention

The invention relates to a controlling method of an electronic device and particularly relates to a controlling method of an electronic device with radio frequency identification and display functions.

Description of Related Art

Now barcode systems are commonly used by companies for management of storage of goods. However, barcode systems have been developed and applied for a long time and gradually come to the limit or the bottleneck. For example, bar code is for reading only, and only one bar code can be read each time. In addition, bar code is read by contact and may easily be damaged. For these reasons, the costs of bar code cannot be further reduced, and human errors are inevitable in the use of bar code. By contrast, a radio frequency identification (RFID) label can be read/written repeatedly, rigid for being used in all weathers, operable without manpower, and feature non-contact auto sensing, and thus is becoming an indispensable technology.

The application of RFID is extensive, typically in areas such as anti-theft appliances, access control, parking lot management, production line automation, animal chips, material management, etc. In terms of industrial application, RFID is especially effective when used in retail business for controlling stocks and reducing supply chain costs, which can lower management costs and improve flexibility in dispatch of goods.

Recently an electronic product that combines a display with RFID technology has been developed. However, according to the current technology, the hardware circuit of the display and the hardware circuit of RFID are usually fabricated separately and independently, and then the two modules are connected by exterior bonding. As a result, the electronic product has a larger size and takes more time and costs for fabrication. In addition, the current technology does not provide an efficient software controlling method for controlling the software execution of the electronic product. For instance, when the display function and the wireless communication function of RFID of the electronic product are executed at the same time, wireless communication signals may interfere with the display (e.g. damascene, etc.) and affect the user's viewing and operation.

SUMMARY OF THE INVENTION

Accordingly, the invention is directed to a controlling method for coexistence of radio frequency identification (RFID) and display functions, so as to efficiently control a sequence of executing the display function and a wireless communication function of RFID of an electronic device.

An embodiment of the invention provides a controlling method for coexistence of RFID and display functions, applicable to an electronic device. The controlling method includes the following steps. A display of the electronic device is powered on and controlled to show a frame. Next, a RFID module of the electronic device is powered on to execute a wireless communication function of the RFID module.

In an embodiment of the invention, the controlling method further includes ceasing powering on the RFID module after the step of executing the wireless communication function of the RFID module.

In an embodiment of the invention, the controlling method further includes controlling the display of the electronic device to enter a power-saving mode after the step of ceasing powering on the RFID module.

In an embodiment of the invention, the controlling method for coexistence of the RFID and display functions further includes determining whether the electronic device executes a first integration mode or a second integration mode.

In an embodiment of the invention, if the electronic device executes the first integration mode, the step of executing the wireless communication function of the RFID module further includes: reading a product history recorded in a RFID label of the electronic device; and controlling the electronic device to connect a back-end application database, so as to identify and compare data related to the product history recorded in the RFID label.

In an embodiment of the invention, the product history includes one of a production serial number, a product specification, a manufacture date, a point-of-sale record, and a maintenance record of the electronic device or a combination of the foregoing.

In an embodiment of the invention, the controlling method for coexistence of the RFID and display functions further includes determining whether the electronic device is maintained; and updating the maintenance record stored in the product history if the electronic device is maintained.

In an embodiment of the invention, if the electronic device executes the second integration mode, the step of executing the wireless communication function of the RFID module further includes: receiving data that is to be stored via the RFID module; and storing the data that is to be stored in the RFID label of the electronic device.

In an embodiment of the invention, the controlling method for coexistence of the RFID and display functions further includes: receiving a password inputted by a user via the electronic device; and determining whether the password matches a preset password. If the password matches the preset password, the electronic device is controlled to execute the first integration mode or the second integration mode.

In an embodiment of the invention, hardware circuits of the RFID module of the electronic device are disposed in a back plate of the display or printed on a flexible printed circuit (FPC) of the display.

In an embodiment of the invention, the display of the electronic device is an electrophoretic display (EPD). The electronic device is an electronic shelf label (ESL).

Based on the above, the controlling method for coexistence of the RFID and display functions in the embodiments of the invention efficiently controls the execution of the display function and the wireless communication function of RFID of the electronic device, so as to prevent mutual interference.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

First, it is noted that an electronic device is provided in the embodiments of the invention, and the electronic device includes a radio frequency identification (RFID) module and a display. More specifically, the embodiments of the invention further integrate the hardware circuits related to the RFID module and the display to reduce the size of the electronic device, which provides the advantages of lower costs and shorter production time.

Figure 1A:
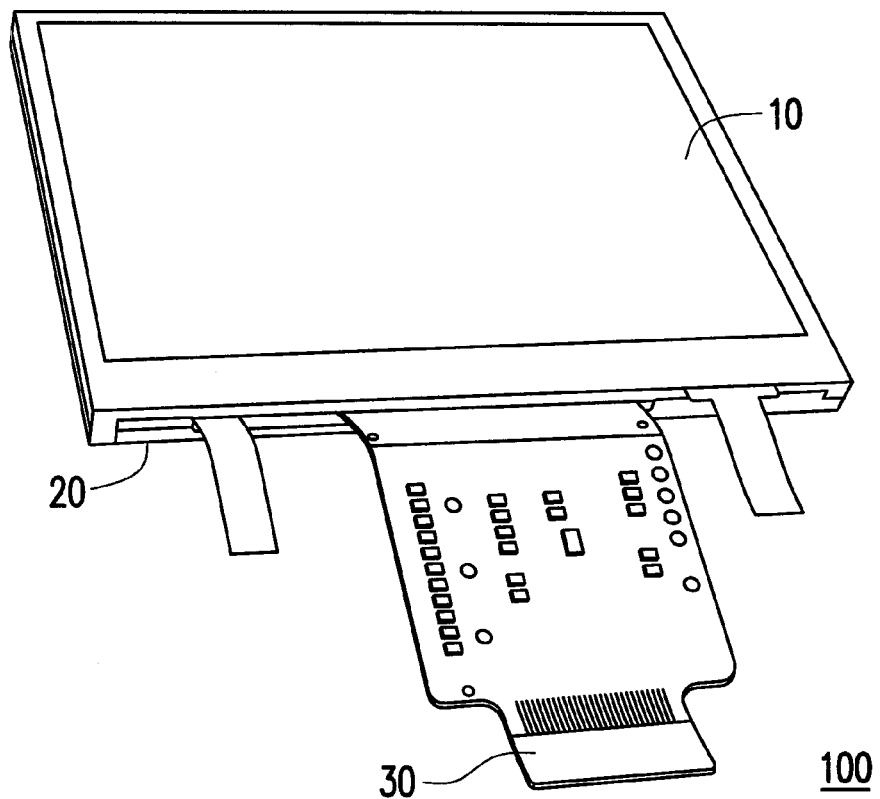
FIG. 1A is a schematic view of a display according to an embodiment of the invention.

FIG. 1A is a schematic view of a display according to an embodiment of the invention. Referring to FIG. 1A, a display 100 includes a display screen 10, a back plate 20, and a flexible printed circuit 30. In an embodiment, the hardware circuits related to the RFID module are disposed in a thin film transistor array of the back plate 20. In another embodiment, the RFID module is printed on the flexible printed circuit 30 of the display 100. The RFID module mainly includes a RF tag, and the hardware circuits related to the RF tag include a transceiver antenna, a driving integrated circuit, and other components, etc.

Figure 1B:
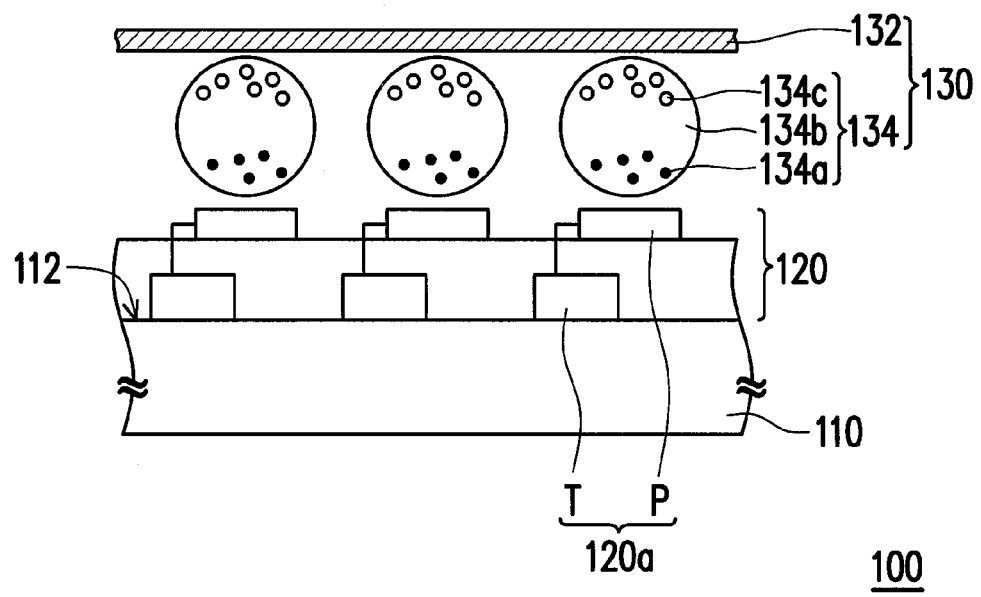
FIG. 1B is a schematic cross-sectional view of a display according to an embodiment of the invention.

In detail, FIG. 1B is a schematic cross-sectional view of a display according to an embodiment of the invention. In this embodiment, the display 100 is, for example, an electrophoretic display (EPD), which is also called an electronic paper display. Referring to FIG. 1B, the display 100 includes a substrate 110, an active device array 120, and an electrophoretic display thin film 130. A material of the substrate 110 is, for example, glass.

To be more specific, the active device array 120 includes a plurality of pixel units 120a disposed on an upper surface 112 of the substrate 110. Each of the pixel units 120a is composed of a pixel electrode P and a thin film transistor T. In this embodiment of the invention, the hardware circuits related to the RFID module are for example disposed in a region outside the pixel units 120a in the active device array 120.

The electrophoretic display thin film 130 is disposed above the substrate 110 and includes an electrode layer 132 and a plurality of microcapsules 134. The microcapsules 134 are located between the electrode layer 132 and the active device array 120. In this embodiment, each of the microcapsules 134 includes an electrophoretic liquid 134b and a plurality of black charged particles 134a and a plurality of white charged particles 134c dispersed in the electrophoretic liquid 134b, wherein the black charged particles 134a and the white charged particles 134c are driven to move by applying a DC voltage or an AC voltage, such that the pixel units 120a respectively display black color, white color, or gray colors of different levels.

Based on the above, the electronic product with integrated hardware circuits related to the RFID module and the display is an electronic shelf label (ESL), for example. The electronic shelf label is extensively used for identification and verification of personal ID or deposit information, e.g. for price tags used in shopping malls, goods management of storehouses, and smart cards, etc. The electronic paper display (EPD) that utilizes electrophoretic technology in this embodiment not only displays numbers or simple words but also displays dynamic advertising information. The electronic shelf label of this embodiment further provides a RFID function and thus the display screen thereof may be directly used to display the information recorded in a RFID label, such that display or product manufacturers may perform product fabrication, product management, product quality maintenance, subsequent track of customer services, etc.

Figure 2:
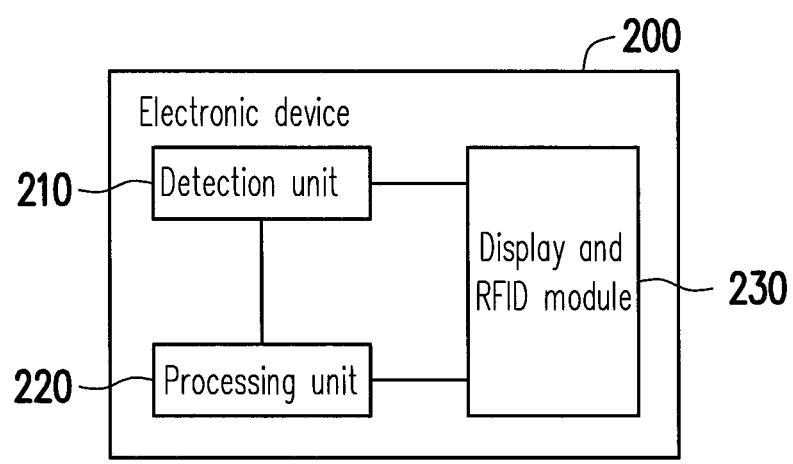
FIG. 2 is a block diagram of an electronic device according to an embodiment of the invention.

FIG. 2 is a block diagram of an electronic device according to an embodiment of the invention. Referring to FIG. 2, an electronic device 200 includes a detection unit 210, a processing unit 220, and a display and RFID module 230. The processing unit 220 is a central processing unit (CPU) or a microprocessor, for example. A hardware structure of the display and RFID module 230 includes the display 100 as shown in FIG. 1A. In addition to the integration of the relevant hardware, the invention further provides a software integration method for coexistence of the radio frequency identification and display functions. The electronic device 200 illustrated in this embodiment is for example an electronic shelf label, which is described below with reference to different flowcharts.

Figures 3A, 3B:
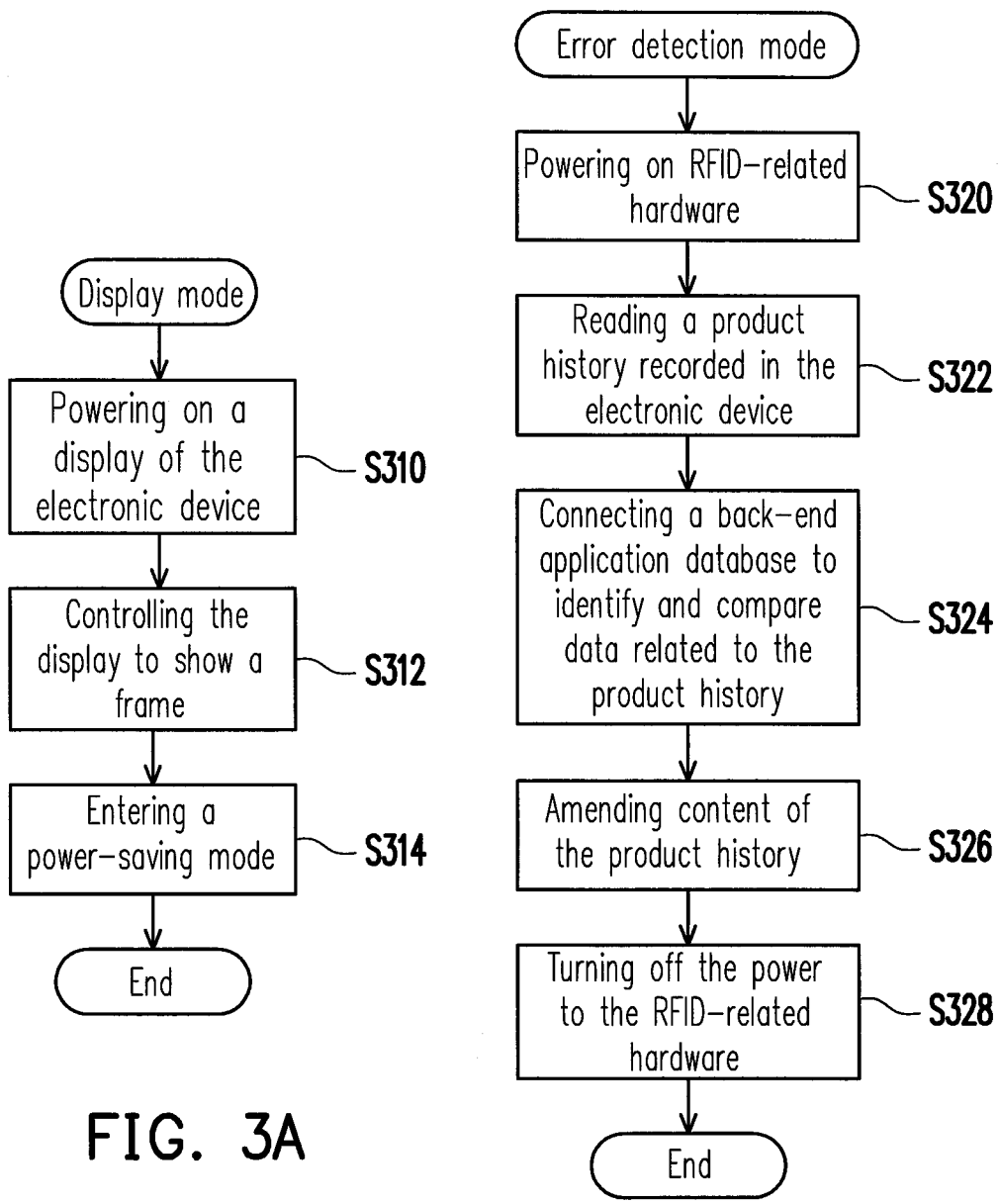
FIGS. 3A through 3C are flowcharts illustrating controlling methods of a display mode, an error detection mode, and a data update mode according to an embodiment of the invention.
Figure 3C:
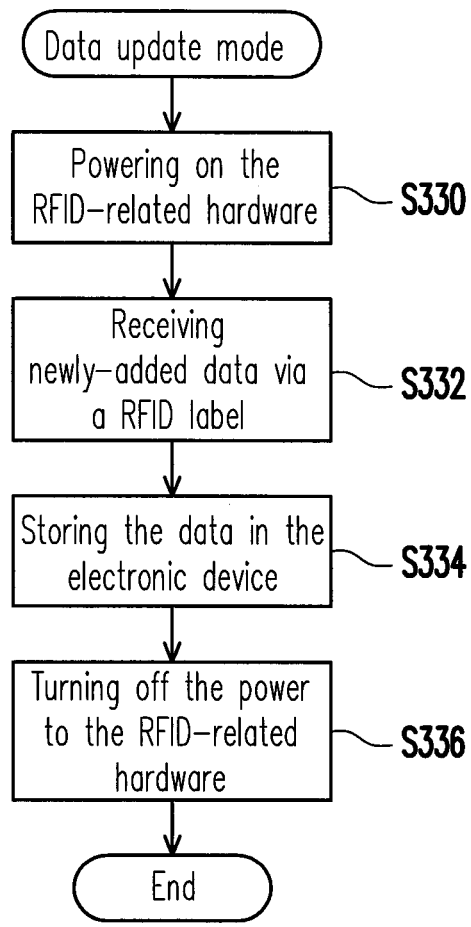

FIGS. 3A through 3C are flowcharts illustrating controlling methods of a display mode, an error detection mode, and a data update mode according to an embodiment of the invention. Please refer to FIG. 2 and FIG. 3A to FIG. 3C.

With reference to FIG. 2 and FIG. 3A, when the processing unit 220 controls the display and RFID module 230 to enter the display mode, the display of the electronic device 200 is powered on (Step S310). Then, the display and RFID module 230 controls the display to show a frame (Step S312). In an embodiment, the shown frame is for example a frame preset by the user; and in another embodiment, the display may show an updated frame according to a touch operation of the user. Next, the display is controlled to enter a power-saving mode (Step S314). The electronic paper display of this embodiment uses electrophoretic technology. The electronic paper display is thin and visible as printed paper, and has a memory characteristic for maintaining the frame display state after power is off. The electronic paper display functions by reflection of natural light from the outside, which does not require a back light module, and thus may enter the power-saving mode to reduce consumption of power.

The electronic device 200 of this embodiment further provides the RFID function. Therefore, the processing unit 220 may control the display and RFID module 230 to enter the error detection mode or the data update mode. Thereafter, please refer to FIGS. 2 and 3B.

When the processing unit 220 controls the display and RFID module 230 to enter the error detection mode, RFID-related hardware is powered on (Step S320). Then, the display and RFID module 230 reads a product history recorded in the RFID label of the electronic device 200 (Step S322). Next, the display and RFID module 230 connects to a back-end application database (not shown) to identify and compare data related to the product history (Step S324). The back-end application database has a function of automatic identification for decoding the information recorded in the RFID label and obtaining the product history related to the electronic device 200 by comparison. The product history includes a production serial number, a product specification, a manufacture date, a point-of-sale record, and a maintenance record, etc. of the electronic device 200, but not limited to the foregoing. The information of the product history allows the manufacturer of the electronic device 200 to trace the production and sales status of electronic products and facilitates product fabrication, product management, product quality maintenance, subsequent track of customer services, etc. Further, the content of the product history may be amended (Step S326). For example, the maintenance staff may update a maintenance record in the product history after maintaining the electronic device 200. In other words, the maintenance record is recorded in the electronic device 200, such that the maintenance staff or service and management staff of the manufacturer may check data related to the product history at any time. Finally, the processing unit 220 turns off the power for the RFID-related hardware (Step S328).

Hereinafter, referring to FIG. 2 and FIG. 3C, the processing unit 220 controls the display and RFID module 230 to enter the data update mode. In the data update mode, the RFID-related hardware is powered on (Step S330). Then, the electronic device 200 receives the data that the user wishes to store in the electronic device 200 via the RFID label, for example (Step S332). The received data is stored in the electronic device 200 (Step S334). Specifically, the data is written into the RFID label, for example. After the data is stored, the processing unit 220 turns off the power for the RFID-related hardware (Step S336).

It should be noted that FIG. 3A to FIG. 3C respectively illustrate the sequences when the modes are executed separately. If the display mode of FIG. 3A and the error detection mode of FIG. 3B are executed at the same time, interference may occur. For instance, if the electronic device 200 executes Step S312 of the display mode and Step S322 of the error detection mode at the same time, the wireless signal generated when the electronic device 200 reads the product history stored therein may interfere with the display (e.g. the displayed frame may have damascene) and affect the user's viewing and operation. In another embodiment, if the display mode of FIG. 3A and the data update mode of FIG. 3C are executed at the same time, the efficiency of the operation of the electronic device 200 may decrease easily. For example, if the electronic device 200 writes data into the RFID label while the display is receiving the touch operation of the user, the efficiency of the operation may be affected.

Considering the above, the electronic device 200 according to the embodiment of the invention further controls the display and RFID module 230 to alternately execute the display function and RFID communication when performing the display function and the RFID function simultaneously. Another embodiment is provided below to explain the above.

Figures 4, 5:
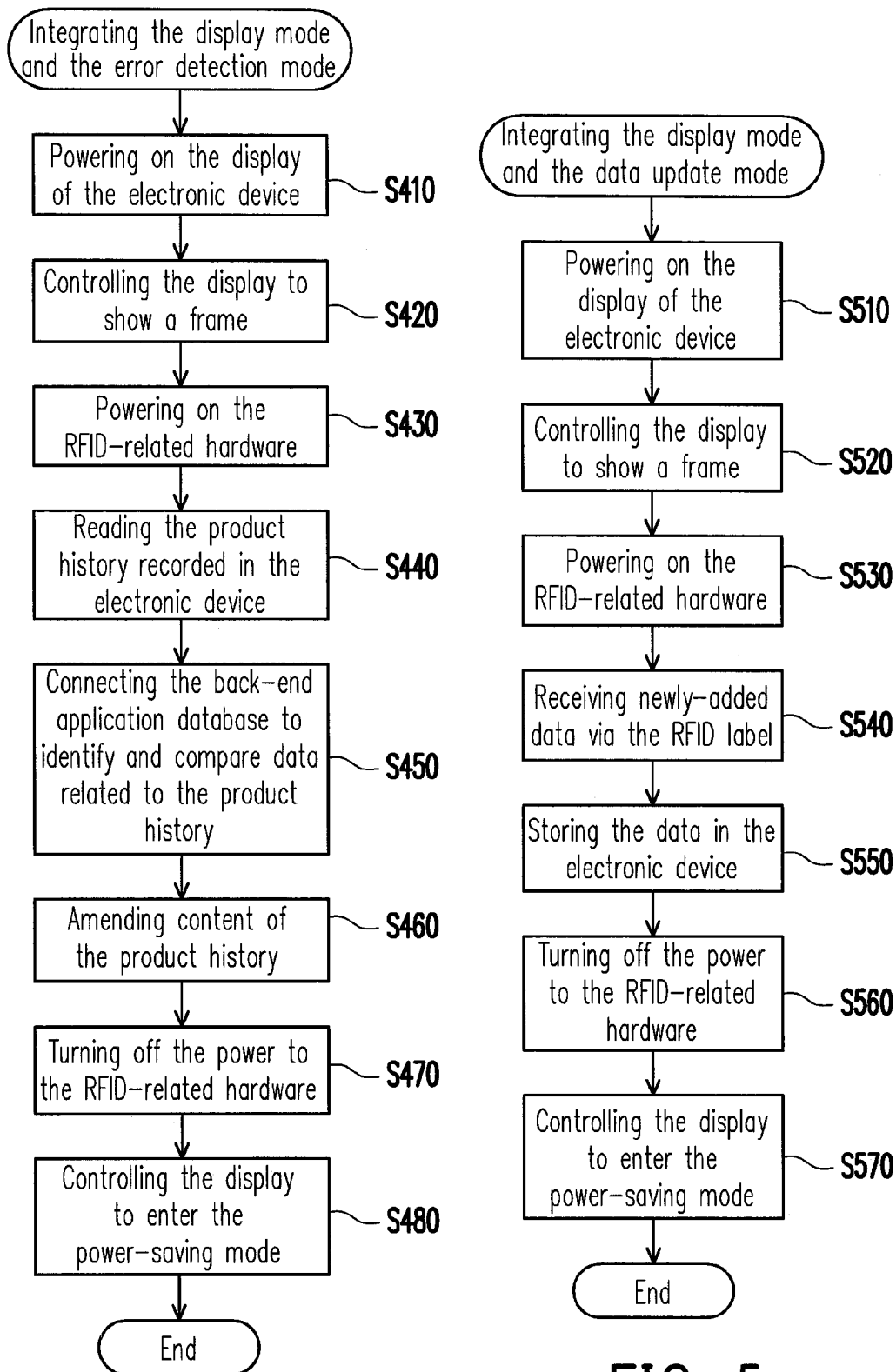
FIG. 4 is a flowchart illustrating a controlling method for integrating a display mode and an error detection mode of an electronic device 200 according to an embodiment of the invention.
FIG. 5 is a flowchart illustrating a controlling method for integrating the display mode and a data update mode of the electronic device 200 according to an embodiment of the invention.

FIG. 4 is a flowchart illustrating a controlling method for integrating the display mode and the error detection mode of the electronic device 200 according to an embodiment of the invention. Referring to FIG. 2 and FIG. 4, the display is powered on (Step S410). The display of the electronic device 200 is controlled to show a frame (Step S420). Next, the RFID-related hardware is powered on (Step S430). The product history recorded in the RFID label of the electronic device 200 is read (Step S440). The display and RFID module 230 is controlled to connect to the back-end application database, so as to identify and compare the data related to the product history (Step S450). After the electronic device 200 is maintained, the maintenance staff updates the maintenance record in the product history accordingly (Step S460). The power for the RFID-related hardware is turned off after the record is updated (Step S470). Finally, the display of the electronic device 200 is controlled to enter the power-saving mode (Step S480). Accordingly, the controlling method of this embodiment integrates the steps of the display mode and the error detection mode in the same period of time, and by efficiently arranging the steps, prevents the wireless signal generated by the RFID function from interfering with the display. In addition, the controlling method of this embodiment allows the manufacturer of the electronic device to easily trace the production process and sales status of electronic products, or enables the maintenance staff to quickly look up the product history of the electronic device for error detection and update the maintenance record in the product history.

FIG. 5 is a flowchart illustrating a controlling method for integrating the display mode and the data update mode of the electronic device 200 according to an embodiment of the invention. Referring to FIG. 2 and FIG. 5, the display is powered on (Step S510). The display of the electronic device 200 is controlled to show a frame (Step S520). Next, the RFID-related hardware is powered on (Step S530). The data that the user wishes to store in the electronic device 200 is received (Step S540). For example, the data is received via the RFID label of the electronic device 200. The received data is stored in the electronic device 200 (Step S550). For example, the data is written into the RFID label. After the data is stored, the power for the RFID-related hardware is turned off (Step S560). Finally, the display of the electronic device 200 is controlled to enter the power-saving mode (Step S570). Accordingly, the controlling method of this embodiment integrates the steps of the display mode and the data update mode in the same period of time, and achieves better input efficiency and power saving by efficiently arranging the steps. The rest of the steps of FIG. 4 and FIG. 5 have been specified in the above embodiments and thus will not be repeated hereinafter.

Figure 6:
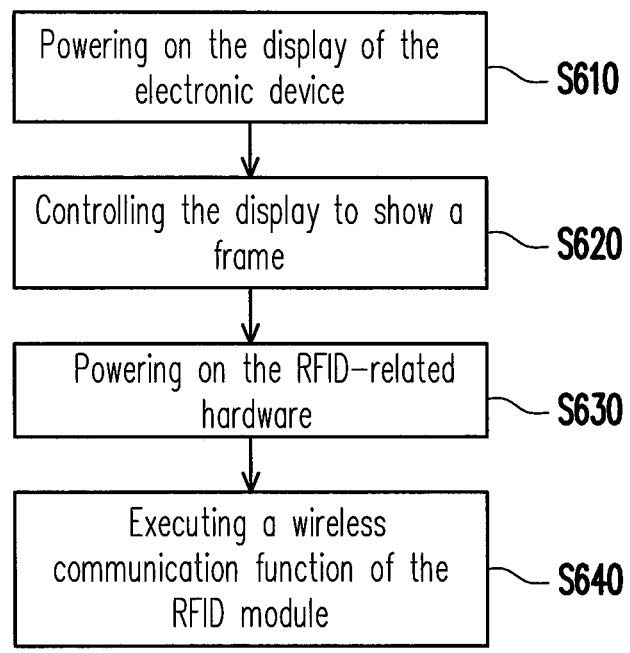
FIG. 6 is a flowchart illustrating a controlling method for coexistence of radio frequency identification and display functions according to an embodiment of the invention.

Another embodiment, as shown in FIG. 6, is deduced from the above. FIG. 6 is a flowchart illustrating a controlling method for coexistence of radio frequency identification and display functions according to an embodiment of the invention. The display of the electronic device is powered on (Step S610) and controlled to show a frame (Step S620). Next, the RFID module of the electronic device is powered on (Step S630) to perform the wireless communication function of the RFID module (Step S640).

It is noted that, before executing the wireless communication function of the RFID module, it is first determined whether the electronic device is executing a first integration mode or a second integration mode. More specifically, the first integration mode is an integration of the display mode and the error detection mode; and the second integration mode is an integration of the display mode and the data update mode. In both the first integration mode and the second integration mode of the electronic device, Step S640 is further divided into several sub-steps. For example, if the electronic device executes the first integration mode, Step S640 is further divided into Steps S440-S460 as shown in FIG. 4. If the electronic device executes the second integration mode, Step S640 is further divided into Steps S540-S550 as shown in FIG. 5.

However, the invention is not limited to the above and may be embodied in other ways, and thus the aforementioned embodiments may be modified to meet the actual demands. That is, the spirit of the invention lies in efficiently arranging the steps of executing the display function and the RFID function to prevent interference. It should be noted that, in the embodiments of the invention, the powering-on of the RFID module may be ceased, and the display of the electronic device may be controlled to enter the power-saving mode after the step of executing the wireless communication function of the RFID module.

Especially, the powering-on of the display is ceased when the product history stored in the electronic device is read, so as to achieve better display performance and power saving. Furthermore, the touch input function of the display is disabled when the content of the RFID label is renewed, so as to achieve better input efficiency and power saving. It is noted that the display (e.g. display 100 illustrated in FIG. 1A and FIG. 1B) may continue displaying the last frame when the powering-on is ceased. Therefore, power saving is achieved without affecting the user's viewing and operation.

In conclusion of the above, according to the embodiments of the invention, the hardware circuits related to the RFID module and the display are further integrated to reduce the size of the electronic device, which provides the advantages of lower costs and shorter production time. The controlling method according to the embodiments of the invention efficiently controls the execution of the display function and the wireless communication function of RFID, so as to achieve better display performance, better input efficiency and power saving. Moreover, the product history recorded in the RFID label according to the embodiments of the invention allows the manufacturer of the electronic device to trace product fabrication, product management, product quality maintenance, subsequent track of customer services, etc.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A controlling method for coexistence of radio frequency identification (RFID) and display functions, applicable to an electronic device, the controlling method comprising:
   determining whether the electronic device executes a first integration mode or a second integration mode;
   powering on a display of the electronic device;
   controlling the display to show a frame;
   powering on a RFID module of the electronic device; and
   executing a wireless communication function of the RFID module, wherein the first integration mode is an integration of a display mode and an error detection mode,
   wherein if the electronic device executes the first integration mode, the step of executing the wireless communication function of the RFID module comprises:
   reading a product history recorded in a RFID label of the electronic device, and the powering on of the display is ceased after the product history has been read, and
   wherein the display of the electronic device is an electrophoretic display (EPD), and the electronic device is an electronic shelf label (ESL).

2. The controlling method according to claim 1, wherein after the step of executing the wireless communication function of the RFID module, the controlling method further comprises:
   ceasing powering on the RFID module.

3. The controlling method according to claim 2, wherein after the step of ceasing powering on the RFID module, the controlling method further comprises:
   controlling the display of the electronic device to enter a power-saving mode.

4. The controlling method according to claim 1, wherein if the electronic device executes the first integration mode, the step of executing the wireless communication function of the RFID module further comprises:
   controlling the electronic device to connect a back-end application database to identify and compare the product history recorded in the RFID label.

5. The controlling method according to claim 4, wherein the product history comprises one of a production serial number, a product specification, a manufacture date, a point-of-sale record, and a maintenance record of the electronic device or a combination of the foregoing.

6. The controlling method according to claim 5, further comprising: determining whether the electronic device is maintained, and if the electronic device is maintained, updating the maintenance record stored in the product history.

7. The controlling method according to claim 1, wherein if the electronic device executes the second integration mode, the step of executing the wireless communication function of the RFID module comprises:
   receiving data that is to be stored via the RFID module; and
   storing the data that is to be stored in the RFID label of the electronic device.

8. The controlling method according to claim 1, further comprising:
   receiving a password inputted by a user via the electronic device; and
   determining whether the password matches a preset password, and if the password matches the preset password, controlling the electronic device to execute the first integration mode or the second integration mode.

9. The controlling method according to claim 1, wherein hardware circuits of the RFID module of the electronic device are disposed in a back plate of the display or printed on a flexible printed circuit of the display.

* * * * *